May 20, 1924.

LA VERNE W. HENCH

VALVE

Filed April 6 1922

1,494,910

Inventor

LaVerne W. Hench

By George C. Alcan Attorney

Patented May 20, 1924.

1,494,910

UNITED STATES PATENT OFFICE.

LA VERNE W. HENCH, OF EAST ORANGE, NEW JERSEY, ASSIGNOR TO INTERNATIONAL OXYGEN COMPANY, A CORPORATION OF NEW JERSEY.

VALVE.

Application filed April 6, 1922. Serial No. 550,002.

*To all whom it may concern:*

Be it known that I, LA VERNE W. HENCH, a citizen of the United States, and resident of East Orange, in the county of Essex and State of New Jersey, have invented certain new and useful Improvements in Valves, of which the following is a specification.

My present invention relates to valves of the type adapted to control in or out flow of high pressure gases but various features of the invention may be employed for controlling the flow of other fluids. More specifically considered, the invention concerns improvements in the well-known commercial type of valve wherein security against leakage is sought by sealing-in the valve chamber by means of a gas-tight diaphragm clamped against an annular seat by a massive screw plug, the valve operating means being outside in operative relation to the outer face of the diaphragm while the valve element is inside the valve chamber in operative relation to the inner sealed-in face of the diaphragm.

In such constructions it has been common to have a cone element of the valve engaging the passage controlled thereby and a base element engaged by the sealed-in face of the diaphragm. For high pressure gases, such diaphragms should be small and must be thin to permit of the required amplitude of opening and closing movements which are to be transmitted therethrough from the exterior operating means to the interior valve element. In practice it is found very undesirable to attempt to rivet, braze or otherwise secure the cone valve to the inner face of the diaphragm because of the weakening effect on the diaphragm.

In valves of the above type, the object of my invention is to hold the base of the valve accurately centered with respect to the diaphragm and valve chamber so that its cone portion will be exactly co-axial with valve opening controlled thereby. I have discovered that this can be accomplished by use of a spiral conical spring, the larger end of which accurately fits in the cavity under the diaphragm while the smaller end accurately fits the cone valve below its base. If desired, centering can be still further fixed by employing a spring metal diaphragm that very accurately fits in a cavity co-axial with the valve cone and the passage controlled thereby, and which has a slight depression accurately centered and fitting the base of the valve cone, said depression preferably being a shallow boss pressed into the metal of the diaphragm the side wall of the boss being steeply inclined.

This is the reverse of the principle embodied in the valve disclosed in my prior application Serial No. 486,393, filed July 20, 1921. In said application, the principle is not to attempt holding the valve in centered position but rather to permit the base of the valve to shift laterally with respect to the diaphragm so that the valve will center itself when the powerful closing pressure is applied to the base of the valve.

Another feature of my invention consists in employing a diaphragm comprising a multiplicity of superposed diaphragm elements preferably made from sheets of thin brass or copper. This material may be say .005 inch more or less in thickness, and when of copper hard rolled to get the required thinness and then annealed, the metal will be dense and strong, yet will stand more flexing than in the case where the same total thickness of metal is in the form of a single sheet diaphragm. I find that with the thin multiple sheets the central boss for accurately centering the valve plug can be accurately sized to the base of the valve. Moreover, while such boss renders the center of the diaphragm practically inflexible, and localizes the flexing in a relatively narrow annulus, yet by reason of the thinness of the layers, said annulus around the boss will still be flexible enough to permit the amplitude of movement required for opening and closing the valve.

Another feature of my invention consists of a simpler and more rugged construction whereby the imperforate diaphragms may be clamped in place and whereby the external operating means may be screw-pressed inward to close the valve and whereby, when the closing pressure is released, the valve will be forcibly held open by the pressure of the spiral spring independently of the resilience of the diaphragm.

The use of the spiral spring in this way is an important feature because said spring may be, and preferably is, quite powerful as compared with the resilience of the diaphragm. Hence I am able to utilize the full amplitude bellying of the diaphragm on both sides of its normal plane, whereas, when the resilience of a diaphragm is relied upon, the initial distance of withdrawal of the cone of the valve from the inlet passage is not more than half the total movement attainable by the employment of the separate spiral spring in accordance with my invention. This is important since the farther the cone is initially withdrawn from the inlet opening, the less likely is entering gas to suck the cone back upon its seat.

The above and other features of my invention will be more evident from the following description in connection with the accompanying drawings, in which Fig. 1 is a vertical section of a valve of a type adapted for use on compressed gas flasks or tanks.

Figure 1:
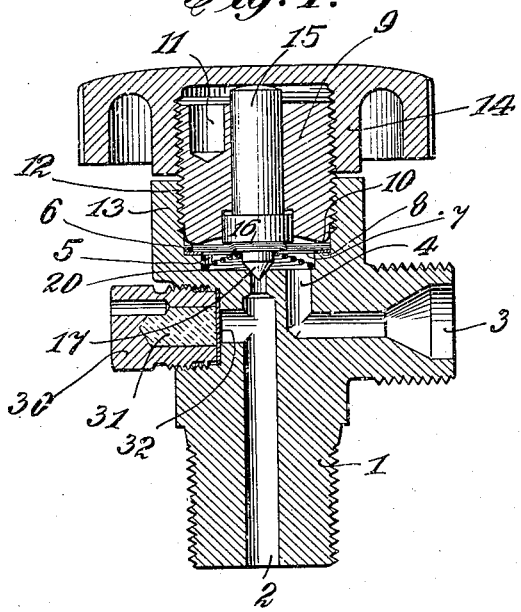
Figure 2:
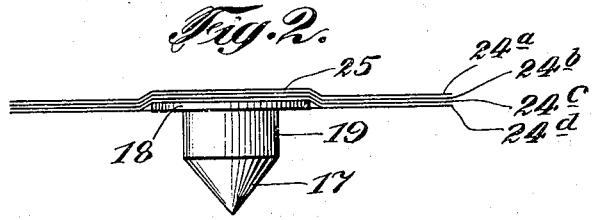
Fig. 2 is a detail section of the multiple diaphragm, the cone associated therewith being shown in elevation.
Figure 3:
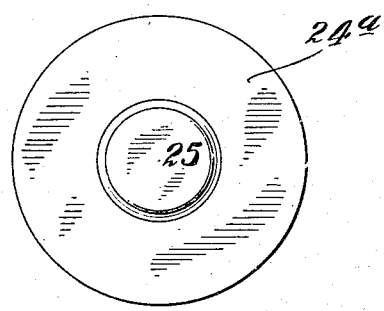
Fig. 3 is a top plan view of Fig. 2.
Figure 4:
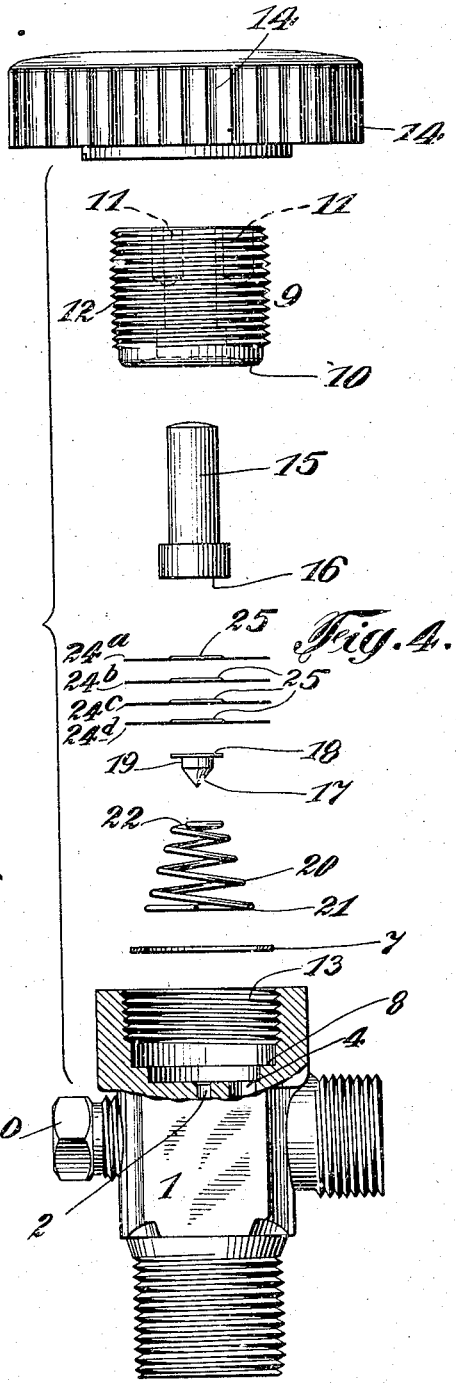
Fig. 4 shows all the parts of Fig. 1, but separated so that each can be seen more clearly.

The valve body or casing element is shown as comprising a screw threaded plug portion 1 adapted to serve as a closure for a compressed gas tank. The valve body is formed with a passage 2 communicating with the gas tank and a passage 3, 4, communicating with the exterior. Passages 2 and 4 open upward into a cylindrical cavity 5. This cavity 5 is closed by the multiple diaphragm 6, clamped against a steel washer 7, resting on ledge 8, the clamping means being a screw plug 9, having a rounded clamping annulus 10 and formed with spanner recesses 11 whereby said plug may be screwed or unscrewed.

The exterior of said plug has a screw thread 12, the lower portion of which engages the threaded barrel portion 13, while the upper portion carries the screw threaded hand wheel 14. The hand wheel 14 operates the opening and closing plug 15 which is slidably mounted in plug 9, and has a flat lower face 16 for centrally engaging the outer face of the diaphragm.

In the cavity 6, is located the valve which comprises a cone portion 17, a base portion 18 and preferably also an intermediate cylindrical portion 19. This valve is held in accurately centered position by means of the spiral spring 20. This spring is of relatively heavy material and is accurately sized and formed so that the lower turn 21 accurately fits in the cavity 5 while the upper turn 22 accurately fits the cylinder portion 19 on the valve and the axes of all three elements are co-incident with the center of the diaphragm.

The multiple diaphragm comprises the spring diaphragm elements $24^a$, $24^b$, $24^c$, etc., there being in the present instance, four such elements, each about .005 inch in thickness. The multiple diaphragm has the accurately sized central boss 25 comprising a depressed portion fitting the base of the valve cone.

The passage 2, valve 17, diaphragm boss 25, plunger 15, screw plug 9 and operating wheel 14, all being exactly co-axial, the valve cone 17 is accurately centered. Hence it does not have to be of steep pitch nor does there have to be a wide valve seat such as is necessary where the valve is designed to shift laterally to center itself, instead of being normally maintained in the centered position.

Though it forms no part of my present invention, I note that the valve casing is provided with a safety plug 30, having soft, fusible metal 31 filling the central cavity, there being preferably also a rupturable diaphragm 32, screw-clamped by the base of the plug 30.

I claim:

1. A valve having a valve chamber formed with inlet and outlet openings, and one wall of said chamber being an imperforate diaphragm opposite and co-axial with one of said openings; a valve element including a cone portion for engaging in the latter opening and having a base portion abutting against but unattached to the diaphragm; and means for centering and retracting said valve element including a conical spiral spring having its base portion accurately centered with respect to the last mentioned opening and its top portion engaging said valve element adjacent its base; in combination with means for operating the valve element including external means for forcing the diaphragm inward against the pressure of said spring.

2. A valve having a valve chamber formed with inlet and outlet openings, and one wall of said chamber being an imperforate diaphragm opposite and co-axial with one of said openings; a valve element including a cone portion for engaging in the latter opening and having a base portion abutting against but unattached to the diaphragm; and means for centering and retracting said valve element including a conical spiral spring having its base portion accurately centered with respect to the last mentioned opening and its top portion engaging said valve element adjacent its base; said diaphragm being formed with a central boss which the base of the valve element accurately fits; in combination with means for operating the valve element including external means for forcing the diaphragm inward against the pressure of said spring.

3. A valve having a valve chamber formed with inlet and outlet openings, and one wall of said chamber being an imperforate diaphragm opposite and co-axial with one of said openings; a valve element including a cone portion for engaging in the latter opening and having a base portion abutting against but unattached to the diaphragm; and means for centering and retracting said valve element including a conical spiral spring having its base portion accurately centered with respect to the last mentioned opening and its top portion engaging said valve element adjacent its base, said diaphragm being formed with a central boss which the base of the valve element accurately fits, the side wall of said boss being steeply inclined to serve as a centering guide for the base of said valve element when the parts are being assembled; in combination with means for operating the valve element including external means for forcing the diaphragm inward against the pressure of said spring.

4. A valve having a valve chamber formed with inlet and outlet openings, and one wall of said chamber being an imperforate diaphragm opposite and co-axial with one of said openings; a valve element including a cone portion for engaging in the latter opening and having a base portion abutting against but unattached to the diaphragm; said diaphragm being formed with a central boss comprising a depressed portion in which the base of the valve element accurately fits, and a valve centering spring continuously pressing said valve base against the bottom of said boss; in combination with means for operating the valve element including external means for forcing the diaphragm inward against the pressure of said spring.

5. A valve having a valve chamber formed with inlet and outlet openings, and one wall of said chamber being an imperforate diaphragm opposite and co-axial with one of said openings; a valve element including a cone portion for engaging in the latter opening and having a base portion abutting against but unattached to the diaphragm, said diaphragm being formed with a central boss comprising a depressed portion in which the base of the valve element accurately fits, the side wall of said boss being steeply inclined to serve as a centering guide for the base of said valve element when the parts are being assembled, and a centering spring continuously pressing said valve base against the bottom of said boss; in combination with means for operating the valve element including external means for forcing the diaphragm inward against the pressure of said spring.

6. A valve having a valve chamber formed with inlet and outlet openings, and one wall of said chamber being an imperforate diaphragm opposite one of said openings, a valve element including a cone portion for engaging in the latter opening and having a base portion in contact with but unattached to the diaphragm, a conical spiral spring having one end fixed with respect to the last-mentioned opening and its movable end engaging said base portion and pressing the diaphragm outward; in combination with means for operating the valve element including external means for forcing the diaphragm inward against the pressure of said spring.

7. A valve having a valve chamber formed with inlet and outlet openings and one wall of said chamber being an imperforate diaphragm clamped in position opposite one of said openings and accurately fitting a cylindrical recess co-axial with said latter opening; and, within said chamber, a valve element including a cone portion for engaging in said opening and having a base portion in contact with but unattached to the diaphragm, a conical spiral centering and retracting spring for said valve, said spring having its large-diameter portion accurately centered with respect to the last mentioned opening and its small-diameter, movable end engaging the base of said valve element; said diaphragm being formed with a central boss comprising a depressed portion in which the base of the valve element accurately fits; in combination with external means for forcing the diaphragm inward against the pressure of said spring.

8. A valve having a valve chamber formed with inlet and outlet openings and one wall of said chamber being an imperforate diaphragm clamped in position opposite one of said openings and accurately fitting a cylindrical recess co-axial with said latter opening; and, within said chamber, a valve element including a cone portion for engaging in said opening and having a base portion in contact with but unattached to the diaphragm, a conical spiral centering and retracting spring for said valve, said spring having its large-diameter portion accurately centered with respect to the last mentioned opening and its small-diameter movable end engaging the base of said valve element; said diaphragm being formed with a central boss comprising a depressed portion in which the base of the valve element accurately fits, and the side wall of said boss being inclined to serve as a centering guide for the base of said valve element when the parts are assembled; in combination with external means for forcing the diaphragm inward against the pressure of said spring.

9. A valve of the class described, including a valve chamber, an imperforate diaphragm closure for one side of said chamber; and a screw bushing clamping said diaphragm exterior of said chamber near its edge; means extending through said bushing for forcibly flexing said diaphragm; inlet and outlet openings both communicating with said valve chamber and one of them being co-axial with said diaphragm, in combination with a valve element located within said valve chamber having a base portion abutting against the center of the diaphragm, and a separate resilient member for forcing the diaphragm outward; said diaphragm consisting of several layers of thin spring metal formed with an accurately centered boss comprising a depressed portion in which the base of the valve element accurately fits.

10. A device specified by claim 9, and wherein the side wall of the boss is steeply inclined to serve as a centering guide for the base of said valve element when the parts are being assembled.

11. A valve of the class described having a cylindrical valve chamber, a fluid flow passage below, and an annular seat above said valve chamber, both co-axial with said chamber; an imperforate diaphragm closure accurately fitting the wall defining said annular seat; and, on the outer side of said diaphragm, a screw bushing for clamping the outer portion of said diaphragm against said seat, a sliding plunger extending through said bushing for flexing said diaphragm, and, within said valve chamber, a valve having a base accurately fitting within a boss accurately centered in the diaphragm, and a valve surface engaging in said flow passage, a coiled spring having a base portion accurately fitting in said cylindrical valve chamber and a top portion accurately fitting said valve.

12. A valve having a valve chamber formed with inlet and outlet openings, and one wall of said chamber being an imperforate diaphragm opposite and co-axial with one of said openings, a valve element having a base portion abutting against but unattached to the diaphragm, said diaphragm being formed with a central boss comprising a depressed portion in which the base of the valve element accurately fits, and a centering spring continuously pressing said valve base against the bottom of said boss; in combination with means for operating the valve element including external means for forcing the diaphragm inward against the pressure of said spring.

13. A valve having a valve chamber formed with inlet and outlet openings, and one wall of said chamber being an imperforate diaphragm opposite and co-axial with one of said openings, a valve element having a base portion abutting against but unattached to the diaphragm, said diaphragm being formed with a central boss comprising a depressed portion in which the base of the valve element accurately fits, the side wall of said boss being steeply inclined to serve as a centering guide for the base of said valve element when the parts are being assembled, and a centering spring continuously pressing said valve base against the bottom of said boss; in combination with means for operating the valve element including external means for forcing the diaphragm inward against the pressure of said spring.

Signed at East Orange, in the county of Essex and State of New Jersey this 4 day of March A. D. 1922.

LA VERNE W. HENCH.